US012607040B2

(12) United States Patent
Overgaard

(10) Patent No.: US 12,607,040 B2
(45) Date of Patent: Apr. 21, 2026

(54) ELECTROMECHANICAL DOOR LOCK ACTUATOR DEVICE WITH WIDTH-ADJUSTABLE GRIPPER MECHANISM AND KIT WITH DIFFERENT GRIPPER JAWS

(71) Applicant: Danalock ApS, Harlev J (DK)

(72) Inventor: Henning Overgaard, Harlev J (DK)

(73) Assignee: Danalock ApS, Harlev J (DK)

( * ) Notice: Subject to any disclaimer, the term of this patent is extended or adjusted under 35 U.S.C. 154(b) by 179 days.

(21) Appl. No.: 18/385,991

(22) Filed: Nov. 1, 2023

(65) Prior Publication Data

US 2024/0093535 A1 Mar. 21, 2024

Related U.S. Application Data

(63) Continuation of application No. PCT/DK2022/050070, filed on Apr. 7, 2022.

(30) Foreign Application Priority Data

May 3, 2021 (DK) .......................... PA 2021 00450

(51) Int. Cl.
*E05B 47/00* (2006.01)

(52) U.S. Cl.
CPC .... *E05B 47/0012* (2013.01); *E05B 2047/002* (2013.01); *E05B 2047/0091* (2013.01); *E05B 2047/0095* (2013.01)

(58) Field of Classification Search
CPC .............. E05B 47/0012; E05B 1/0007; E05B 2047/002; E05B 2047/0091; E05B 2047/0095
See application file for complete search history.

(56) References Cited

U.S. PATENT DOCUMENTS

| | | | | |
|---|---|---|---|---|
| 5,678,436 | A * | 10/1997 | Alexander | E05B 47/0012 70/456 R |
| 9,476,232 | B1 | 10/2016 | Verdecia et al. | |
| 9,546,504 | B2 | 1/2017 | Overgaard | |
| 10,443,264 | B1 | 10/2019 | Son | |
| 10,683,677 | B1 * | 6/2020 | Funamura | E05B 17/0075 |
| 11,959,308 | B2 * | 4/2024 | Petty | E05B 47/0012 |
| 12,067,855 | B2 * | 8/2024 | Abueshsheikh | G08B 25/00 |
| 2006/0283219 | A1 * | 12/2006 | Bendz | E05B 47/0012 70/431 |
| 2010/0011822 | A1 * | 1/2010 | Imedio Ocana | E05B 47/0615 70/278.7 |
| 2010/0127517 | A1 | 5/2010 | Bliding et al. | |
| 2010/0154494 | A1 | 6/2010 | Sakai et al. | |
| 2015/0096341 | A1 * | 4/2015 | Overgaard | E05B 47/02 70/283.1 |

(Continued)

FOREIGN PATENT DOCUMENTS

| | | | |
|---|---|---|---|
| AT | 7270 | U1 | 12/2024 |
| CN | 111321940 | A | 6/2020 |

(Continued)

*Primary Examiner* — Mark A Williams
(74) *Attorney, Agent, or Firm* — Elevated IP, LLC

(57) ABSTRACT

An electromechanical door lock actuation device with a motor for rotation of a connector-receiver that has two jaws for gripping a door knob or key when the device is installed on a door blade, wherein the width between the jaws is adjustable for a tight fit against the knob or key.

20 Claims, 3 Drawing Sheets

(56) References Cited

U.S. PATENT DOCUMENTS

| | | | | |
|---|---|---|---|---|
| 2018/0044943 | A1* | 2/2018 | Tanaka | E05B 47/0012 |
| 2018/0061163 | A1* | 3/2018 | Ku | E05B 63/0056 |
| 2019/0010731 | A1* | 1/2019 | Overgaard | E05B 47/026 |
| 2019/0112838 | A1* | 4/2019 | Grimm | F16P 3/10 |
| 2020/0199910 | A1* | 6/2020 | Khan | E05B 47/0012 |
| 2021/0262251 | A1 | 8/2021 | Taniuchi et al. | |
| 2024/0076905 | A1* | 3/2024 | Overgaard | E05B 47/026 |

FOREIGN PATENT DOCUMENTS

| | | | |
|---|---|---|---|
| CN | 111379469 | A | 7/2020 |
| DE | 3311992 | A1 | 10/1984 |
| DE | 102004021704 | | 12/2005 |
| DE | 102014113764 | A1 | 3/2016 |
| DE | 102017127982 | A1 | 5/2019 |
| EP | 3677738 | A1 | 7/2020 |
| EP | 3775444 | B1 | 9/2021 |
| FI | 12336 | U1 | 4/2019 |
| FR | 2849084 | B1 | 9/2005 |
| FR | 3098838 | B1 | 7/2021 |
| JP | H0725175 | U | 5/1995 |
| JP | 2018059391 | A | 4/2018 |
| JP | 2019015037 | A | 1/2019 |
| WO | 2005024160 | A1 | 3/2005 |
| WO | 2008101928 | A1 | 8/2008 |
| WO | 2016194304 | A1 | 12/2016 |
| WO | 2017114534 | A1 | 7/2017 |
| WO | 2020003487 | A1 | 1/2020 |
| WO | 2020124308 | A1 | 6/2020 |

* cited by examiner

ELECTROMECHANICAL DOOR LOCK ACTUATOR DEVICE WITH WIDTH-ADJUSTABLE GRIPPER MECHANISM AND KIT WITH DIFFERENT GRIPPER JAWS

CROSS-REFERENCE TO RELATED APPLICATIONS

This application is a continuation under 35 U.S.C. 111 of International Patent Application No. PCT/DK2022/050070, filed Apr. 7, 2022, which claims the benefit of and priority to Danish Application No. PA 2021 00450, filed May 3, 2021, each of which is hereby incorporated by reference in its entirety.

FIELD OF INVENTION

The present invention relates to an electromechanical door lock actuator device. It also relates to a mounting kit with such device.

BACKGROUND

International patent application WO2017/114534 by Overgaard and assigned to Danalock discloses an electromechanical door lock actuator that is mounted to the surface of a door blade for actuating a door lock inside the door blade. The actuator has a cylindrical body inside which there is provided a battery-driven motor. The motor rotates a pin-receiver that connects to a driver pin extending from the door lock into the back of the actuator. The pin-receiver is rotated by the motor when the actuator is operating due to a wireless signal starting the motor in one or the other direction. A manual turning knob is provided for locking and unlocking by hand instead of the motor.

U.S. Pat. No. 9,546,504 by Overgaard discloses an electromechanical door lock actuator of similar construction with respect to a central pin-receiver that is rotated by a motor. Three types of adapters are provided for adapting the pin-receiver to the specific type of driver pin of the door lock.

International patent application WO2005/024160 assigned to Aptus Elektronik AB discloses an electromechanical door lock actuator with a manual turning lock handle which is connected to the door lock by a driver pin.

International patent application WO2016/194304 discloses an electromechanical door lock actuator with a lock motor/handle module and an adapter module for gripping and rotating the already existing knob on the door lock. For proper fitting, the module can be equipped with couplings having grooves of different lengths and widths. Different couplings are also disclosed in Chinese patent application CN 111379496A.

German patent DE 10 2004 021704 B3 discloses an electromechanical door lock actuator, where a motor module through sprocket gear rotates an adapter in an adapter module. The adapter has a slot for a key of the door in order to take up the key in the slot and rotationally actuate the key. A U-shaped claw grips around the end of the key. In order for properly adapting to the length of the key, the claw is spring loaded. However, due to the predetermined width of the claw that grabs around the end of the key, the width is not adjustable and accordingly only works for a few standard keys.

Specifically for American locks, US2010/0011822 discloses a lock insert that is modified in order to provide a pin connection between the actuator and the lock.

As it appears from the above, adaptation of locks is primarily done by providing one adapter for each specific type of pin connector, key or handle. Although, there appears to be a widespread desire to adapt electromechanical door lock actuators to various types of locks, the general approach is to provide a new adapter, each time an actuator has to be adapted to a specific type of lock.

It would be desirable to provide a more universal technical solution.

BRIEF DESCRIPTION

It is therefore an objective of the invention to provide an improvement in the art. In particular, it is an objective to provide a more universal technical solution for adapting electromechanical door lock actuators to the specific type of door lock. This objective and further advantages are achieved with electromechanical door lock actuator devices and mounting kits as described below and in the claims.

In short, the electromechanical door lock actuation device has a motor for rotation of a connector-receiver that has two jaws for gripping a door knob or key when the device is installed on a door blade, wherein the width between the jaws is adjustable for a tight fit against the knob or key.

In practice, the device is mounted onto the surface of a door blade for operating a door lock in the door blade, typically as a mortise lock mounted inside the door blade or inside the door frame. For this operation, the device comprises a driver mechanism for motorized rotation of a connector, for example key or knob, that is functionally connected to the door lock and arranged for driving a lock bolt in the door lock by rotation of the connector.

The device comprises a casing, inside which there is provided a rotational connector-receiver for receiving and rotating the connector from the door lock, for example a key, pin, or knob, when the casing is mounted on the door blade. For the motorized rotation of the connector, the device comprises a motor inside the casing. The motor is functionally and mechanically, typically by gear wheels, connected to the connector-receiver. The connector-receiver comprises a slot for receiving the connector and for connecting thereto.

Particularly, in order to be more versatile than the prior art, a width-adjustable gripper arrangement is provided that comprises jaws arranged on opposite sides of the slot for gripping the connector between the jaws. The width-adjustable gripper arrangement comprises a width adjustment mechanism for adjusting the width between the jaws and thus abutting the connector with the jaws by a tight fit adjustment. Advantageously, the distance between the jaws is steplessly adjustable, for example by screws, optionally one screw is acting on one jaw and another screw acting on the opposite jaw.

In some embodiments, at least one of the jaws, but typically both oppositely arranged jaws, comprises an elastomeric surface for secure grip on the connector. For example, the elastomeric surface comprises elongate grooves that are not perpendicular to an axis of rotation of the connector-receiver, optionally the grooves are parallel to the axis of rotation.

In some practical embodiments, at least one of the jaws comprises an elastomeric block for abutting the connector.

Advantageously, a bending mechanism is provided inside the adapter module, configured for adjusting a radius of curvature of the jaw, for example of the elastomeric block.

By adjusting the curvature, the jaw is adapted to an outer curvature of the connector for secure grip on the connector. Especially, it is pointed out that door knobs can have various sizes, be it circular or oval, and an adjustment of the jaws to approximately follow the round surface improves the grip.

For example, in practice, a stabilizing plate is provided on or in the elastomeric block, where the stabilizing plate has a higher stiffness than the elastomeric block. Optionally, the bending mechanism comprises a screw mechanism with at least one screw arranged for deforming the jaw, for example by deforming the stabilizing plate in the elastomer block, by rotation of the at least one screw. In some embodiments, two screws are provided, one at each of two opposite ends of the jaw, for example one at each of two opposite ends of the stabilizing plate.

In some practical embodiments, the device is modular and comprises

- an actuator module having an actuator casing, for example cylindrical casing, the casing containing the motor and, typically, also the batteries, for driving the motor as well as the necessary electronics,
- an adapter module having an adapter casing containing the connector-receiver but not the motor,
- a connector module having a first side for abutting the door blade and an opposite side carrying the actuator module and the adapter module in a side-by-side configuration, wherein the connector module contains part of the arrangement of intermeshing gear wheels with a gear wheel at the location of the actuator module and a gear wheel at the location of the adapter module for mechanically and functionally interconnecting the motor in the actuator module with the connector-receiver in the adapter module.

For example, the actuator module but not the adapter module comprises a handle for manually rotating the connector-receiver through the arrangement of intermeshing gear wheels.

In order to adjust the device to various types of connectors, including keys with different thicknesses and door knobs of different sizes and types, including round of oval, a kit is optionally provided as follows. It comprises a device as described above with a first and a second pair of jaws. The first pair of jaws is provided with plane surfaces and the second pair of jaws is provided with curving surfaces. The installer can then select the best fitting pair of jaws and install them in the adapter module of the device on site, for example as part of a retrofit. This way, the connector can be held by abutment with the plane surfaces of the first pair of jaws or with the curved surfaces by the second pair of jaws, whichever is best. For example, the jaws are provided with elastomer surfaces, for example elastomer blocks, and are adjustable with respect to their curvature, as described above, which is useful for fine-tuning the connector-receiver.

The operation of the motor can be regulated by a controller in various ways. Important is that the motor is stopped when the lock bolt of the lock has moved to an end position or at least to a position where the locking or unlocking is safeguarded.

For example, the lock bolt is driven until it meets a hardware stop, which makes further driving of the lock bolt by the motor impossible, increasing the power consumption of the motor, which is measured electronically and the motion of the motor stopped in this direction. Alternatively, an angular motion decoder is used which controls the angular maximum or at least sufficient rotation of the connector-receiver and stops the motor prior to the lock bolt reaching a hardware stop.

The motor of the device can in principle be activated by power from a power source that is started by manually pushing a push button contact that closes an electrical circuit. Instead of the push button contact, an electrical relay switch can be used, for example operated automatically. Alternatively or in addition, the motor is activated by turning of the handle; a decoder reads the turning of the connector-receiver by the manually rotatable handle, which activates the motor in order to assist the user in locking or unlocking the door.

As a particularly advantageous option, the device is operated remotely by a wireless signal. For example, the device comprises a receiver inside the casing for receiving and executing wireless digital command data for locking or unlocking the door lock, the receiver being functionally coupled to the motor for activating the motor in dependence of the locking or unlocking command. For example, the receiver is configured for wireless digital command signals, for example Bluetooth, WIFI, Z-wave, ZigBee, or other radio frequency signals. An integrated circuit inside the casing is configured and programmed for activating the motor in either direction upon receiving a corresponding wireless command signal by the receiver, for example from a smartphone or pager. Typically, however, the device will contain a transceiver for bidirectional digital communication with a programmable computer system for controlling the device remotely, for example by a smartphone or other type of computer, optionally with encrypted digital communication. The latter can be achieved with corresponding encryption keys communicated between the integrated circuit and the smartphone or other type of computer that is used for remotely operating the device. Also, additional WiFi transmission to multiple devices is an option.

For example, the actuator module contains the electronics for controlling the locking and unlocking action by the motor through the adapter module. Optionally, it also contains the wireless transceiver for the wireless communication for receiving wireless commands for locking and unlocking and for delivering wireless status information.

As it appears from the above, the device is useful for retrofits on existing doors with existing door locks. During such retrofit, such device is mounted onto the door blade such that the slot of the connector-receiver takes up the connector, for example a key or knob, after which the width adjustment mechanism is adjusted to fit snugly against the connector.

BRIEF DESCRIPTION OF THE DRAWINGS

The invention will be explained in more detail with reference to the drawings, where.

DETAILED DESCRIPTION

Figure 1A:
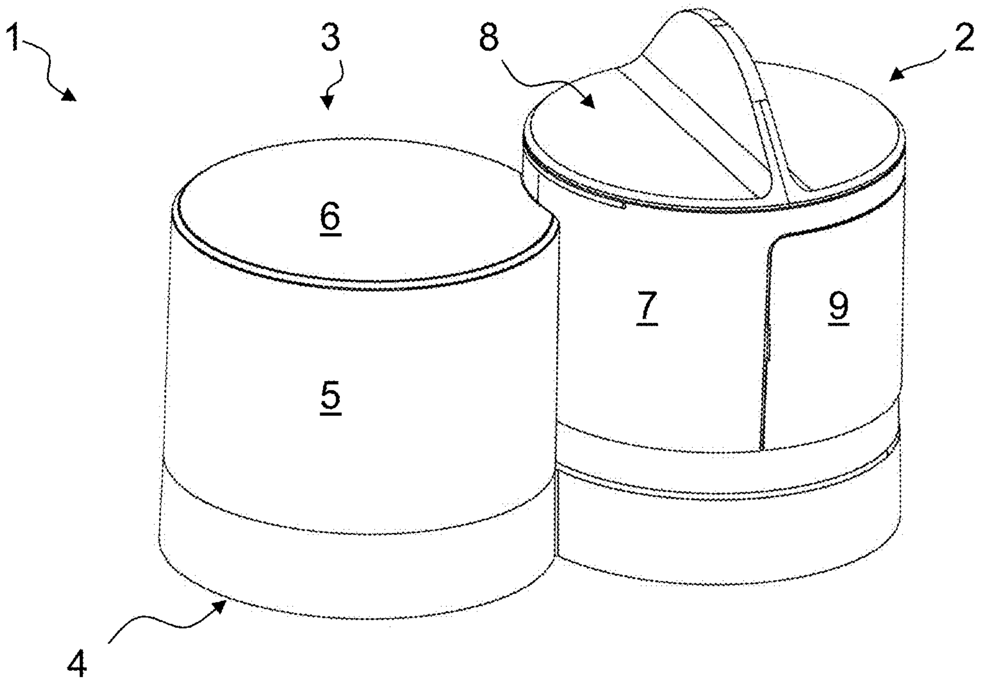
FIG. 1A illustrates a device in perspective view with a casing covering the device.

FIG. 1A illustrates an electromechanical door lock actuator device 1. The device comprises a double module with an actuator module 2 and an adapter module 3 in addition to a connector module 4 that connects the actuator module 2 and the adapter module 3 mechanically and functionally. The adapter module 3 has a largely cylindrical wall 5 that extends from the connector module 4 to a cover plate 6. The actuator module 2 has a cylindrical wall 7 that extends from the connector module 4 to a manual handle 8 that functions as a cover of the actuator module 2. The manual handle 8 can be used for locking and unlocking in additional to the motor function. As part of the cylindrical wall 7 of the actuator module 2, a door 9 is provided for access to batteries inside the actuator module 2.

Figure 1B:
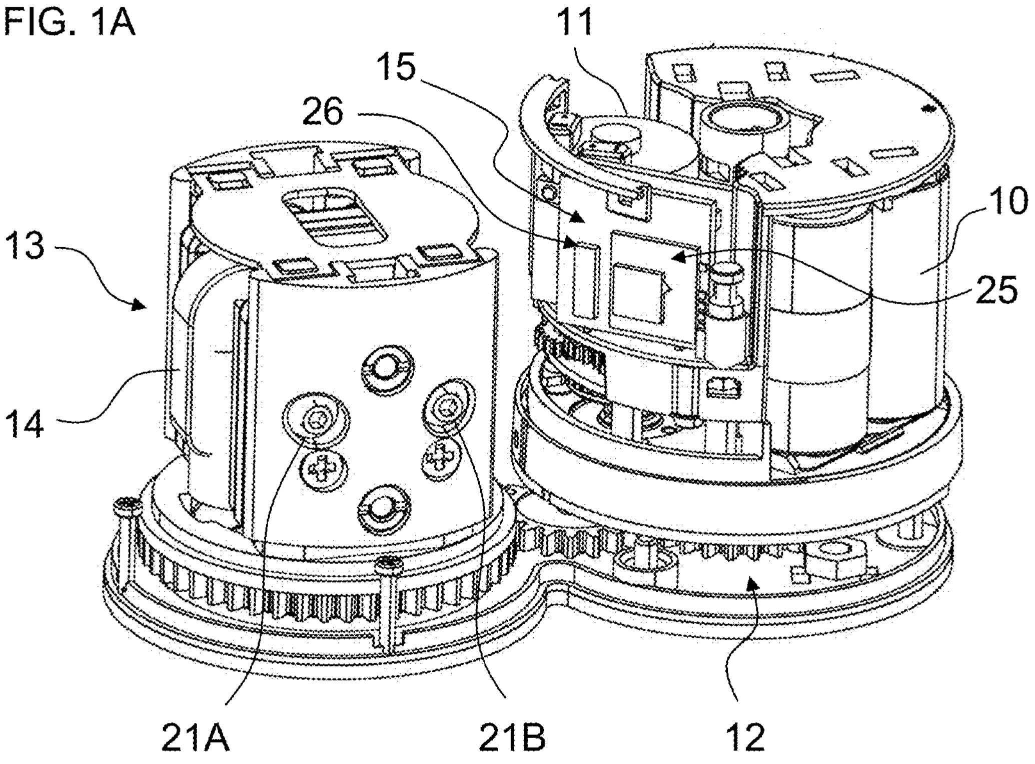
FIG. 1B illustrates the device of FIG. 1A with the casing removed.

FIG. 1B illustrates the actuator device 1 in a view where the walls 5 and 7 have been removed in order to show the interior.

The actuator module 2 comprises a number of batteries 10 for providing electricity to a motor 11, which by switching current-direction can be driven in opposite directions. In operation, the motor 11 drives an arrangement 12 of intermeshing gear wheels. The gear wheels of the actuator module 2 intermesh with the gear wheels of the adapter module 3.

The adapter module 3 comprises a connector-receiver 13 for adapting the motor-driven gear wheel arrangement 12 to a rotational connector of the door, for example a key 14 or a handle.

The actuator module comprises electronics 15 for controlling the locking and unlocking action by the motor 11 through the adapter module 3. The electronics 15 comprise a controller 25 for the motor 11 and a wireless transceiver 26 for receiving digital wireless commands, for example programming commands or actuation commands, and for delivering wireless status information.

Typically, the wireless communication is done by Bluetooth with a smartphone and/or through a WiFi system. Various other options exist, including Z-wave, ZigBee, or other types of radio frequency signals.

The controller 25 comprises a start/stop function that rotates the rotational connector-receiver 13, and thus connector of the door lock, until the door's lock bolt reaches appropriate extreme positions for an open or closed state of the door. The start/stop function can be programmed into a computer program of the controller 25, or a sensor that measures resistance of the lock bolt can be used as a start and stop feature, optionally combined with a measurement of the travel distance of the lock bolt in order to make sure that the lock bolt has been moved sufficiently to actually lock the door.

Figure 2:
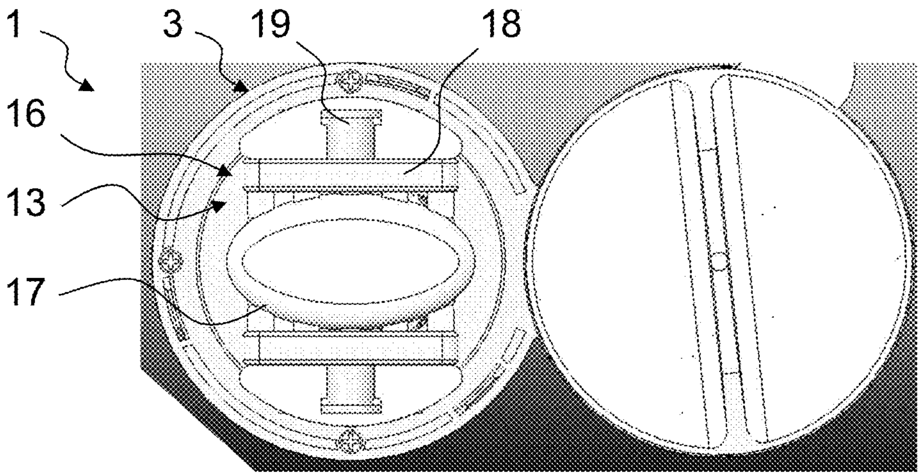
FIG. 2 is a top view onto the connector-receiver holding a door knob between the jaws.

FIG. 2 illustrates some details of an embodiment, where the adapter module 3 contains a first embodiment of a connector-receiver 13. This connector-receiver 13 comprises a width-adjustable gripper arrangement 16 that is designed for door knobs 17, where the door knobs 17 are used for unlocking and potentially also for locking a door. The gripper arrangement 16 comprises two oppositely arranged jaws 18 that abut opposite sides of the illustrated elliptical door knob 17. The width between the jaws 18 can be adjusted by a width-adjustment arrangement, typically comprising screws 19. Screws 19 are useful in that the adjustment of the width is stepless.

Figure 3:
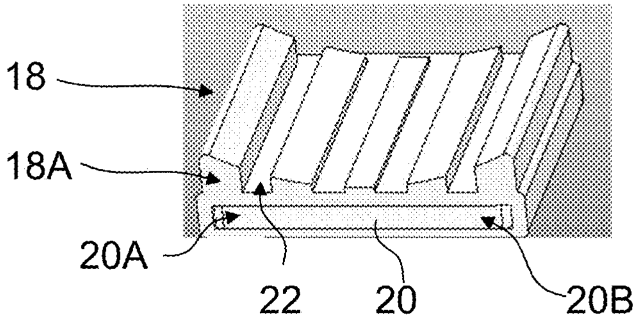
FIG. 3 illustrates a curved jaw.

FIG. 3 illustrates in greater detail one of the jaws 18. For example, the jaw 18 comprises a polymer block 18A, typically made of an elastomeric polymer, which has a high degree of friction against smooth surfaces, especially metallic surfaces. The overall shape of the jaw 18 is concave in a direction perpendicular to a rotation axis of the door knob 17 that is held between the jaws 18 in order to largely follow the curvature of the surface of the knob 17.

As an option, it is also possible to provide the jaw 18 with a curvature in two dimensions, although this has not been found necessary in practice.

It has been found useful, however, to provide the jaw 18 with a profile that comprises grooves 22 that extend across the jaw 18 in a direction parallel with the rotation axis of the door knob 17. The grooves 22 provide enhanced grip on the door knob 17, especially when the jaw 18 comprises an elastomer surface, such as an elastomer block 18A.

As an option, the curvature of the jaw 18 is adjustable. For this purpose, the elastomeric block 18A of the jaw 18 is supported by a bendable plate 20, for example a metal plate. The adapter module 2 is equipped with curvature-adjustment screws, 21A, 21B, as illustrate in FIG. 1B, which act on different ends of the bendable plate 20 for by tightening the curvature-adjustment screws 21A, 21B to increasingly bend the bendable plate 20 so that the radius of curvature of the jaw 18 gets smaller. Optionally, the curvature-adjustment screws 21A, 21B are fastened to the plate 20 so that end parts 20A, 20B of the plate 20 can be pushed or pulled from an idle state into a pre-stressed state in one or the opposite direction so that the radius of curvature can be decreased and increased from an idle state.

As an alternative to the described arrangement of the central width-adjustment screw 19 and the curvature-adjustment screws 21A, 21B, it is possible to use an arrangement where central screws, instead of width adjustment screws 19, are used for adjusting the curvature, and another width-adjustable gripper arrangement is used for the width adjustment, for example two screws at locations similar to the location of the screws 21A, 21B.

Figure 4:
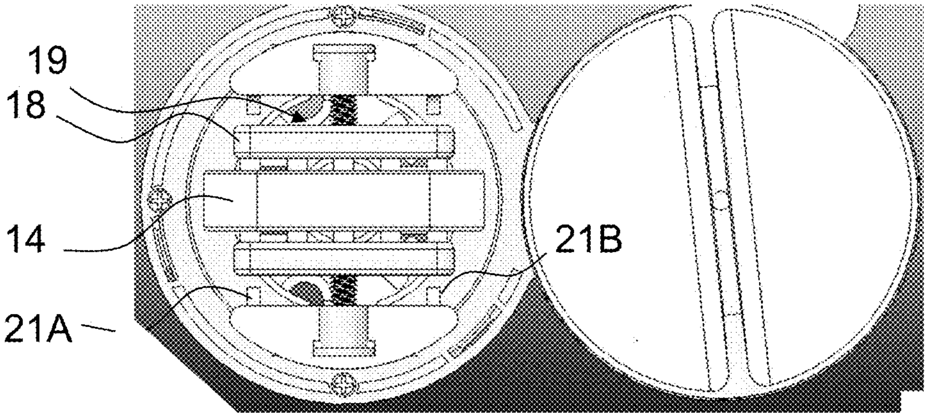
FIG. 4 is a top view onto the connector-receiver holding a key between the jaws.

FIG. 4 illustrates an embodiment in which the jaws 18 are straight. This embodiment is useful for keys 14 of different thickness. Also, in this embodiment, the width between the jaws 18 can be adjusted by width adjustment screws 19 in order to make the distance between the jaws 18 fit to the thickness of the key 14.

Optionally, also these jaws 18 that are straight in their idle state can be pre-stressed by adjustment screws 21A, 21B in order for deviating from the straight idle state into a bent state in one direction where the jaw surface towards the key becomes concave. As a further option, the screws 21A, 21B and the jaws 18 are arranged such that the jaws 18 can also be bent into a convex configuration.

In order to provide an electromechanical door lock actuator device 1 that is universal with respect to adaptation to various door lock systems, be it with keys or with knobs, the device can be provided as part of a kit in which various pairs of jaws 18 are provided which are then inserted into the adapter module 3 as necessary in order to achieve optimal fit. Potentially the kit includes a pair of jaws 18 with a straight surface as well as a pair of jaws with curved surfaces, optionally several pairs with different curvatures in order to adjust to elliptical knobs 17 as well as circular knobs of various sizes.

Figure 5:
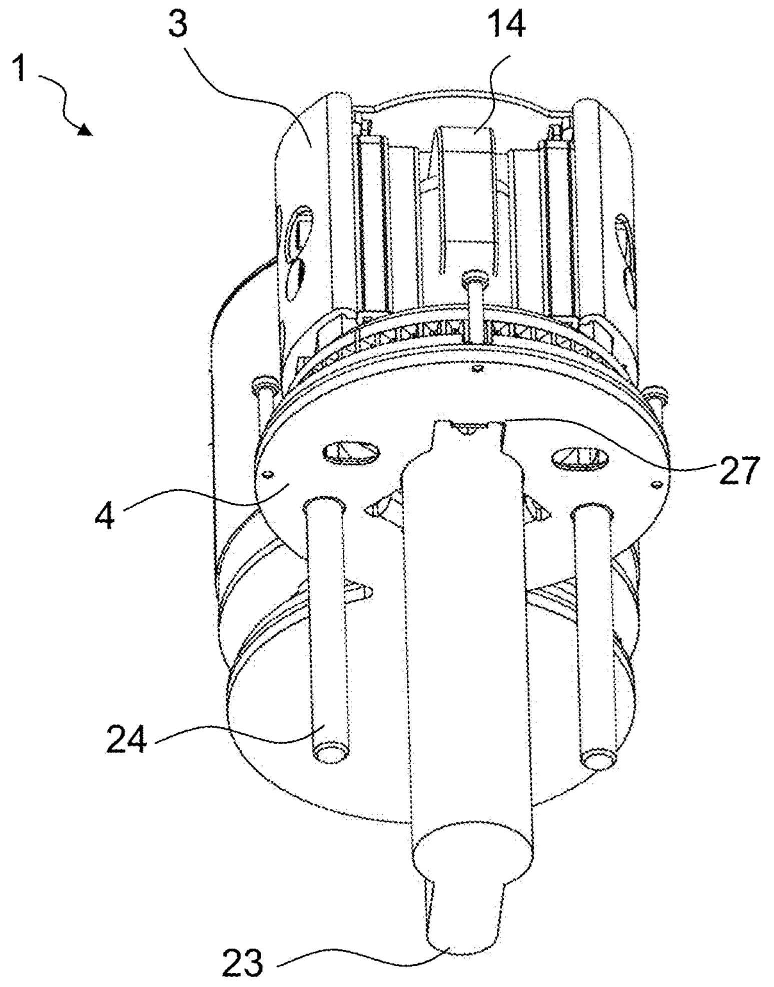
FIG. 5 is a perspective view onto the first side of the connector module from the side that is mounted against a door blade.

FIG. 5 illustrates a possible connection between the adapter module 3 and a lock cylinder 23 that extends from the connector module 4 through a corresponding notch 27 into the door blade (not shown) in which the door lock with the lock bolt (not shown) is located. Fastening bolts 24 extend from the connector module 4 into the door, typically into the door lock, in order to fasten the electromechanical door lock actuator device 1 to the door. A key 14 extends into the lock cylinder 23, which is actuated by motorized rotation of the key 14 in the adapter module 3.

REFERENCE NUMBERS

1—electromechanical door lock actuator device
2—actuator module
3—adapter module
4—connector module
5—cylindrical wall of adapter module 3
6—cover plate of adapter module
7—cylindrical wall of actuator module 2
8—manual handle
9—battery door
10—battery
11—motor
12—arrangement of intermeshing gear wheels
13—connector-receiver
14—key
15—electronics
16—width-adjustable gripper arrangement
17—door knob
18—jaw
18A—polymer block of the jaw
19—width-adjustment screws
20—bendable plate in polymer block 18A of jaw 18
20A, 20B end parts of the plate 20
21A, 21B—curvature-adjustment screws
22—groove in jaw 18
23—lock cylinder
24—fastening bolt
25—controller
26—wireless transceiver
27—notch

What is claimed is:

1. An electromechanical door lock actuation device for mounting onto a surface of a door blade and for operating a door lock in the door blade, the device comprising:

a driver mechanism for motorized rotation of a connector that is functionally connected to the door lock and arranged for driving a lock bolt in the door lock by rotation of the connector;

a connector-receiver for receiving and rotating the connector when the device is mounted on the door blade;

a motor that is functionally and mechanically connected to the connector-receiver through a gear wheel arrangement;

wherein the connector-receiver comprises a slot for receiving the connector and a width-adjustable gripper arrangement comprising jaws arranged on opposite sides of the slot for gripping the connector between the jaws, the width-adjustable gripper arrangement comprising a width adjustment mechanism for adjusting a width between the jaws for forming a tight fit against the connector.

2. The device according to claim 1, wherein the connector is a key or a door knob.

3. The device according to claim 1, wherein the width between the jaws is steplessly adjustable.

4. The device according to claim 3, wherein the width between the jaws is steplessly adjustable by screws, wherein one screw acts on one jaw and another screw acts on an opposite jaw.

5. The device according to claim 1, further comprising a bending mechanism provided inside an adapter module, the bending mechanism configured for adjusting a curvature of at least one of the jaws to an outer curvature of the connector.

6. The device according to claim 1, wherein at least one of the jaws has an elastomeric surface for securely gripping the connector.

7. The device according to claim 6, wherein the elastomeric surface comprises elongated grooves that are not perpendicular to an axis of rotation of the connector-receiver.

8. The device according to claim 6, wherein at least one of the jaws comprises an elastomeric block for abutting the connector, wherein a bending mechanism is provided inside an adapter module, the bending mechanism configured for adjusting a curvature of the elastomeric block to an outer curvature of the connector.

9. The device according to claim 8, further comprising a stabilizing plate provided on or in the elastomeric block, the stabilizing plate having a higher stiffness than the elastomeric block.

10. The device according to claim 9, wherein the bending mechanism comprises a screw mechanism with at least one screw arranged for deforming the stabilizing plate by rotation of the at least one screw.

11. The device according to claim 7, wherein at least one of the jaws comprises an elastomeric block for abutting the connector, wherein a bending mechanism is provided inside an adapter module, the bending mechanism configured for adjusting a curvature of the elastomeric block to an outer curvature of the connector.

12. The device according to claim 11, further comprising a stabilizing plate provided on or in the elastomeric block, the stabilizing plate having a higher stiffness than the elastomeric block.

13. The device according to claim 12, wherein the bending mechanism comprises a screw mechanism with at least one screw arranged for deforming the stabilizing plate by rotation of the at least one screw.

14. The device according to claim 1, wherein the device is modular and comprises:

an actuator module having an actuator casing enclosing the motor;

an adapter module having an adapter casing enclosing the connector-receiver but not the motor;

a connector module having a first side for abutting the door blade, an opposite side carrying the actuator module, and the adapter module in a side-by-side configuration, wherein the connector module contains part of the gear wheel arrangement with a gear wheel at a location of the actuator module and another gear wheel at a location of the adapter module for mechanically and functionally interconnecting the motor in the actuator module with the connector-receiver in the adapter module.

15. The device according to claim 14, wherein the actuator module but not the adapter module comprises a handle for manually rotating the connector-receiver through the gear wheel arrangement.

16. The device according to claim 14, wherein the actuator module contains electronics for controlling a locking and unlocking action by the motor through the adapter module, wherein the electronics comprise a controller for the motor and a wireless transceiver for receiving wireless commands for the locking and unlocking action and for delivering wireless status information.

17. The device according to claim 15, wherein the actuator module contains electronics for controlling a locking and unlocking action by the motor through the adapter module, wherein the electronics comprise a controller for the motor and a wireless transceiver for receiving wireless commands for the locking and unlocking action and for delivering wireless status information.

18. A kit comprising:

the device of claim 1, wherein the jaws comprise a first pair of jaws and a second pair of jaws, the first pair of jaws having plane surfaces and the second pair of jaws having curved surfaces for selective mounting of the first pair of jaws or the second pair of jaws in the adapter module for selectively abutting the connector with the plane surfaces of the first pair of jaws or with the curved surfaces of the second pair of jaws.

19. The kit according to claim 18, further comprising a bending mechanism configured for adjusting a curvature of at least one of the jaws to an outer curvature of the connector.

20. The kit according to claim 19, wherein the bending mechanism deforms a stabilizing plate provided on or in an elastomeric block of at least one of the jaws.

* * * * *